(12) United States Patent
Hiura et al.

(10) Patent No.: US 6,628,310 B1
(45) Date of Patent: Sep. 30, 2003

(54) METHOD OF AND SYSTEM FOR TURNING OVER A WINDOW THAT IS LAID OVER ANOTHER WINDOW, AND RECORDING MEDIUM HAVING PROGRAM OF TURNING OVER A WINDOW THAT IS LAID OVER ANOTHER WINDOW

(75) Inventors: Takanori Hiura, Tokyo (JP); Katsuaki Hiura, Hiroshima-Ken (JP)

(73) Assignee: Chapelle Planning Co., Ltd., Tokyo (JP)

( * ) Notice: Subject to any disclaimer, the term of this patent is extended or adjusted under 35 U.S.C. 154(b) by 336 days.

(21) Appl. No.: 09/594,713

(22) Filed: Jun. 16, 2000

(51) Int. Cl.$^7$ ................................................ G09G 5/00
(52) U.S. Cl. ...................................... 345/776; 345/782
(58) Field of Search ................................ 345/776, 781, 345/782, 777, 778, 764

(56) References Cited

U.S. PATENT DOCUMENTS

| | | | |
|---|---|---|---|
| 4,692,757 A | 9/1987 | Tsuhara et al. | |
| 4,706,076 A | 11/1987 | Racchini | |
| 5,119,476 A | 6/1992 | Texier | |
| 5,367,623 A | 11/1994 | Iwai et al. | |
| 5,463,725 A | * 10/1995 | Henckel et al. | ............. 345/776 |
| 5,519,827 A | 5/1996 | Mizushima | |
| 5,745,109 A | 4/1998 | Nakano et al. | |
| 5,825,349 A | 10/1998 | Meier et al. | |
| 5,859,638 A | 1/1999 | Coleman et al. | |
| 5,870,092 A | * 2/1999 | Bedford-Roberts | ......... 345/776 |
| 5,900,876 A | * 5/1999 | Yagita et al. | ............... 345/776 |
| 5,917,491 A | 6/1999 | Bauersfeld | |
| 5,933,142 A | 8/1999 | LaStrange et al. | |
| 5,991,780 A | 11/1999 | Rivette et al. | |
| 6,002,398 A | 12/1999 | Wilson | |
| 6,064,384 A | * 5/2000 | Ho | ............................. 345/839 |

FOREIGN PATENT DOCUMENTS

JP            04021068 A     1/1992

* cited by examiner

Primary Examiner—Kristine Kincaid
Assistant Examiner—Thanh Vu
(74) Attorney, Agent, or Firm—Rabin & Berdo, P.C.

(57) ABSTRACT

The present invention provides a method of turning over a window that is laid over another window in order to peek a content of another window that is laid under the window in a pseudo-three dimensional manner, in a multi-windows computer system. The method includes the steps of (a) selecting a first window from the multi-windows by placing an object on the first window; (b) clicking the object on the first window to initiate an operation of turning over; and (c) dragging the object toward a direction to which the first window is to be turned over so as to unveil a second window that is laid under the first window, whereby enabling to peek a content of the second window.

15 Claims, 19 Drawing Sheets

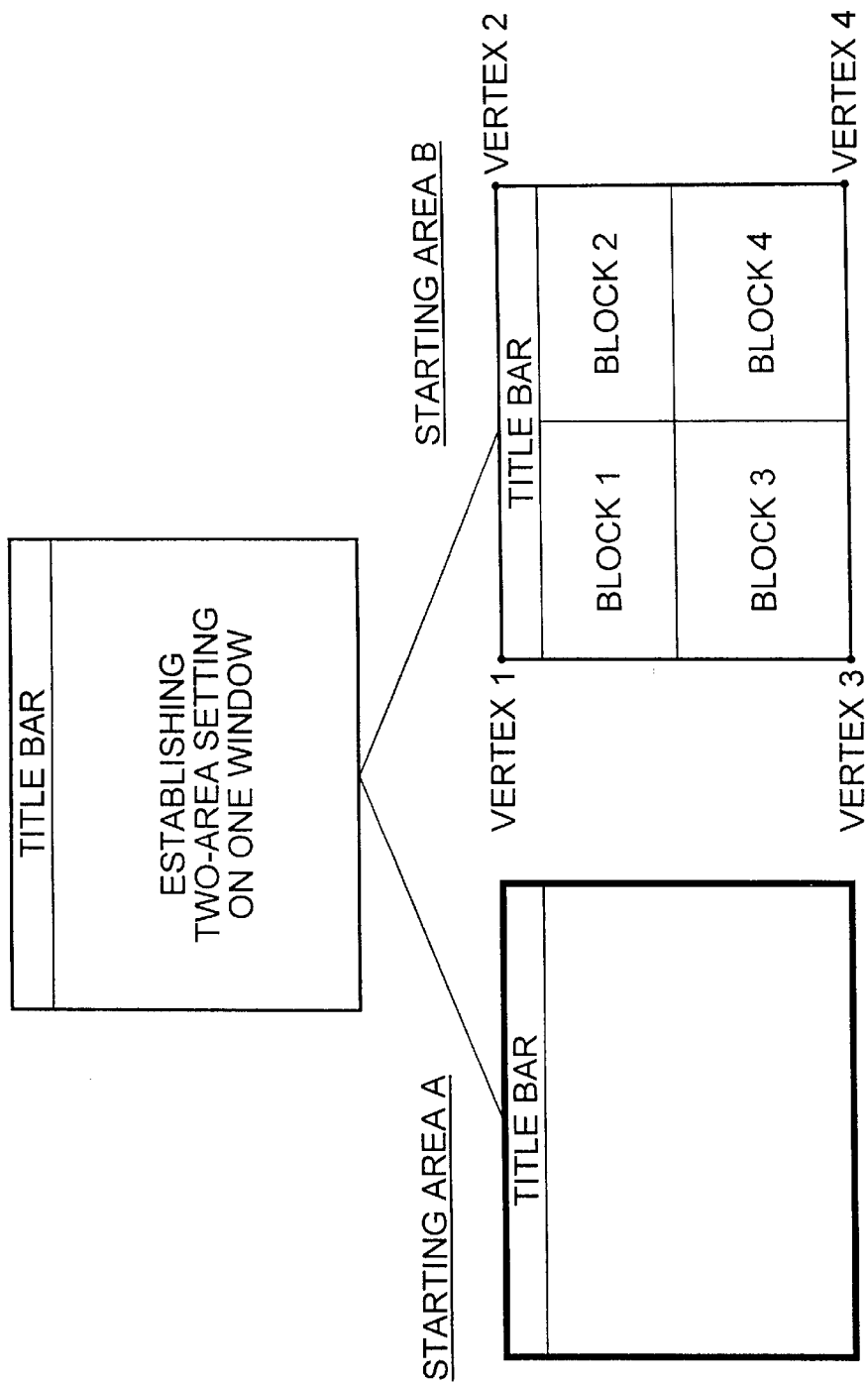

METHOD OF AND SYSTEM FOR TURNING OVER A WINDOW THAT IS LAID OVER ANOTHER WINDOW, AND RECORDING MEDIUM HAVING PROGRAM OF TURNING OVER A WINDOW THAT IS LAID OVER ANOTHER WINDOW

BACKGROUND OF THE INVENTION

1. Field of the Invention

The present invention relates to a method of and a system for turning over a window that is laid over another at a system level of an Operating System (OS) and a recording medium having a program of turning over a window being laid over second window at the system level of the OS.

2. Description of the Related Art

As a conventional technique, it is well-known that there is a multi-windows system for providing a plurality of windows or display areas on a screen of a display device of a computer system.

For instance, in this multi-windows system, there is provided a graphical user interface which displays a window on a display where the window comprises plural pages, such as disclosed in the U. S. Pat. No. 5,745,109. In the U. S. Pat. No. 5,745,109, only one of the plural pages can he displayed at one time and each of the plural pages has at least one object therein selectable by a user to carry out a function corresponding thereto. It also includes the graphical user interface which also displays miniature windows while the window is displayed on the display. Each of the miniature windows corresponds to each of the plural pages of the window and each of the miniature windows is equal to the number of the objects included in a corresponding page of the window.

Further, there is also known an information processing apparatus which is capable of opening two or more windows on screen and processing one or more objects on each page. It includes the means for pasting one or more tag: windows at any location of each page, the means for registering one or more objects in the tag window pasted by the pasting means, and the means for displaying only the non-overlapped portion of the tag window linked to the page if the linked page is partially hidden under another page, such as disclosed in the U.S. Pat. No. 5,367,623.

Moreover, in the multi-windows system, it is well-known that when it is desirable to glance a window or page being laid under the top window or page, there is a method of shifting or removing a top window or page, and then shifting back or moving back the top window or page to an original location or any desirable location after having glanced the page being laid under the top window or page. In other words, in the known system and apparatus such as described above, these mechanisms A are provided in two-dimensional way, i.e., the window or the page is just slid into a desirable direction on a planar surface of the display screen in order to glance the content of the window or page being laid under the top window or page.

SUMMARY OF THE INVENTION

Accordingly, it is an object of the present invention to provide a method of turning over a window that is laid over another window as an extended feature of a multi-windows type OS (Operating System) in order to peek a content of another window in a pseudo-three dimensional manner.

The above-mentioned object of the present invention can be achieved by a method of turning over a window that is laid over another window in order to peek a content of another window that is laid under the window in a pseudo-three dimensional manner, in a multi-windows computer system, the method includes the steps of: (a) selecting a first window from the multi-windows by placing an object on the first window; (b) clicking the object on the first window to initiate an operation of turning over; and (c) dragging the object toward a direction to which the first window is to be turned over so as to unveil a second window that is laid under the first window, whereby enabling to peek a content of the second window.

Preferably, the method of the present invention further includes the step of: (d) Inactivating the operation of turning to put the first window in an initial state thereof, thereby veiling the second window as being laid under the first window.

In the method of the present invention, it is preferable that the step (b) further includes the steps of: (b-1) clicking the object by placing it at any location on an appropriate area of the first window so as to start an operation of a turn-over function; (b-2) evaluating a first location on the first window at where the clicking is made; and (b-3) setting an appropriate fulcrum in accordance with a result of the evaluation step.

It is preferably that in the method of the present invention, the step (c) further includes the steps of: (c-1) evaluating whether or not the object is dragged toward the fulcrum; (c-2) if the object is dragged to a second location on the first window toward the fulcrum in the step (c-1), then calculating an amount of turning over the first window based on the first location and the second location; and (c-3) turning over the first window toward the fulcrum in sequential manner in accordance with the calculated amount of turning over so that a movement of the first window is animated as if it is being, rolled in a pseudo-three dimension to unveil the second window that is laid under the first window.

More preferably, in the method of the present invention, the appropriate area is any part of a frame of the first window, and the step (b-3) includes at least one of the steps of: (b-3-1) if it is clicked at a corner of the first window in the step (b-3), then as the fulcrum, setting a point at which two lines intersect at right angle to each other in a right triangle such that a hypotenuse thereof is formed by a diagonal from the clicked corner to an opposite corner thereof; and (b-3-2) if it is clicked at a side of the first window in the step (b-3), then as the fulcrum, setting a center of an opposite side of the clicked side.

In the method of the present invention, the appropriate area consists of a plurality of blocks, the plurality of blocks covering an entire area of the first window, preferably.

Moreover, in the method of present invention, the appropriate area consists of four blocks, the four blocks covering an entire area of the first window, and wherein the four blocks include a first block having a first vertex of the first window, a second block having a second vertex of the first window, and a third block having a third vertex of the first window, and a fourth block having a fourth vertex of the first window, and the step (b-3) includes any one of the steps of: (b-3-1) if it is clicked on the first block in the step (b), setting the first vertex as a starting point and setting the fourth vertex as the fulcrum; (b-3-2) if it is clicked on the second block in the step (b), setting the second vertex as a starting point and setting the third vertex as the fulcrum; (b-3-3) if it is clicked on the third block in the step (b), setting the third vertex as a starting point and setting the second vertex as the fulcrum; and (b-3-4) if it is clicked on the fourth block in the step (b), setting the fourth vertex as a starting point and setting the first vertex as the fulcrum.

Another object of the present invention can be achieved by a system for turning over a window that is laid over another window in order to peek a content of another window that is laid under the window in a pseudo-three dimensional manner, in a multi-windows computer system, the system includes: (a) an input unit for selecting a first window from the multi-windows by placing an object on the first window, and for clicking the object on the first window to initiate an operation of turning over; and (b) a control unit for controlling the operation of turning over in accordance with the input means by dragging the object toward a direction to which the first window is to be turned over so as to unveil the second window that is laid under the first window, whereby enabling to peek a content of the second window.

Preferably, in the system of the present invention, the control unit further includes a unit for inactivating the operation of turning in accordance with the input unit to put the first window in an initial state thereof, thereby veiling the second window as being laid under the first window.

In the system of the present invention, it is preferably that the control unit includes: (b-1) a unit for clicking the object by placing it at any location on an appropriate area of the first window with the input unit so as to start an operation of a turn-over function; (b-2) a unit for evaluating a first location on the first window at where the clicking is made; and (b-3) a unit for setting an appropriate fulcrum in accordance with a result of the evaluation.

More preferably, in the system of the present invention, the control unit includes: (c-1) a unit for evaluating whether or not the input unit is dragged toward the fulcrum; (c-2) a unit for calculating an amount of turning over the first window based on the first location and the second location if the input unit is dragged to a second location on the first window toward the fulcrum in the step (c-1); and (c-3) a unit for turning over the first window toward the fulcrum in sequential manner in accordance with the calculated amount of turning over so that a movement of the first window is animated as if it is being rolled in a pseudo-three dimension to unveil the second window that is laid under the first window.

It is preferable that in the system of the present invention, the appropriate area is any part of a frame of the first window, and wherein the unit for setting includes at least one of: (b-3-1) a unit for setting a point at which two lines intersect at right angle to each other in a right triangle as the fulcrum such that a hypotenuse thereof is formed by a diagonal from the clicked corner to an opposite corner thereof, if it is clicked at a corner of the first window in the step (b-3); and (b-3-2) a unit for setting a center of an opposite side of the clicked side as the fulcrum, if it is clicked at a side of the first window in the step (b-3).

In the system of the present invention, the appropriate area preferably consists of a plurality of blocks, the plurality of blocks covering an entire Area A of the first window.

Preferably, in the system of the present invention, the appropriate area consists of four blocks, the four blocks covering an entire area of the first window, and wherein the four blocks include a first block having a first vertex of the first window, a second block having a second vertex of the first window, and a third block having a third vertex of the first window, and a fourth block having a fourth vertex of the first window, wherein the unit for setting includes any one of: a unit for setting the first vertex as a starting point and setting the fourth vertex as the fulcrum if it is clicked on the first block in the step (b); (b-3-2) a unit for setting the second vertex as a starting point and setting the third vertex as the fulcrum if it is clicked on the second block in the step (b); (b-3-3) a unit for setting the third vertex as a starting point and setting the second vertex as the fulcrum if it is clicked on the third block in the step (b); and (b-3-4) a unit for setting the fourth vertex as a starting point and setting the first vertex as the fulcrum if it is clicked on the fourth block in the step (b).

Yet another object of the present invention can be achieved by a recording medium having a program of turning over a window that is laid over another window in order to peek a content of another window that is laid under the window in a pseudo-three dimensional manner, in a multi-windows computer system, the program includes the steps of: (a) selecting a first window from the multi-windows by placing an object on the first window; (b) clicking the object on the first window to initiate an operation of turning over; and (c) dragging the object toward a direction to which the first window is to be turned over so as to unveil a second window that is laid under the first window, whereby enabling to peek a content of the second window.

In the recording medium of the present invention, preferably, the program further includes the step of: (d) Inactivating the operation of turning to put the first window in an initial state thereof, thereby veiling the second window as being laid under the first window.

It is preferable that in the recording medium of the present invention, the step (b) further includes the steps of: (b-1) clicking the object by placing it at any location on an appropriate area of the first window so as to start an operation of a turn-over function; (b-2) evaluating a first location on the first window at where the clicking is made; and (b-3) setting an appropriate fulcrum in accordance with a result of the evaluation.

Preferably, in the recording medium of the present invention, the step (c) further includes the steps of: (c-1) evaluating whether or not the object is dragged toward the fulcrum; (c-2) if the object is dragged to a second location on the first window toward the fulcrum in the step (c-1), then calculating an amount of turning over the first window based on the first location and the second location; and (c-3) turning over the first window toward the fulcrum in sequential manner in accordance with the calculated amount of turning over so that a movement of the first window is animated as if it is being rolled in a pseudo-three dimension to unveil the second window that is laid under the first window.

Moreover, in the recording medium of the present invention, the appropriate area is any part of a frame of the first window, and wherein the step (b-3) includes at least one of the steps of: (b-3-1) if it is clicked at a corner of the first window in the step (b-3), then as the fulcrum, setting a point at which two lines intersect at right angle to each other in a right triangle such that a hypotenuse thereof is formed by a diagonal from the clicked corner to an opposite corner thereof; and (b-3-2) if it is clicked at a side of the first window in the step (b-3), then as the fulcrum, setting a center of an opposite side of the clicked side-Further preferably, in the recording medium of the present invention, the appropriate area consists of a plurality of blocks, the plurality of blocks covering an entire area of the first window.

It is preferable that in the recording medium of the present invention, the appropriate area consists of four blocks, the four blocks covering an entire area of the first window, and wherein the four blocks include a first block having a first vertex of the first window, a second block having a second vertex of the first window, and a third block having a third vertex of the first window, and a fourth block having a fourth vertex of the first window, wherein the step (b-3) includes any one of the steps of: (b-3-1) if it is clicked on said first block in the step (b), setting said first vertex as a starting point and setting the fourth vertex as the fulcrum; (b-3-2) if it is clicked on the second block in the step (b), setting the second vertex as a starting point and setting the third vertex as the fulcrum; (b-3-3) if it is clicked on the third block in the step (b), setting the third vertex as a starting point and setting the second vertex as the fulcrum; and (b-3-4) if it is clicked on the fourth block in the step (b), setting the fourth vertex as a starting point and setting the first vertex as the fulcrum.

Further objects and advantages of the invention can be more fully understood from the following detailed description taken in conjunction with the accompanying drawings in which:

BRIEF DESCRIPTION OF THE DRAWINGS

FIG. 5 is a diagram showing two kinds of the starting areas;

DESCRIPTION OF THE PREFERRED EMBODIMENT(S)

In the following the preferred embodiments of the present invention will be described in detail with reference to the accompanying drawings.

As one example, the system 10 includes (a) an input unit IU for selecting a first window W1 from a multi-windows by placing an object OB on the first window W1, and for clicking the object OB on the first window W1 to initiate an operation of turning over, and (b) a control unit CU for controlling the operation of turning over in accordance with the input unit IU by dragging the object OB toward a direction to which the first window W1 is to be turned over so as to unveil the second window W2 that is laid under the first window W1, whereby enabling to peek a content of the second window W2.

Figure 1:
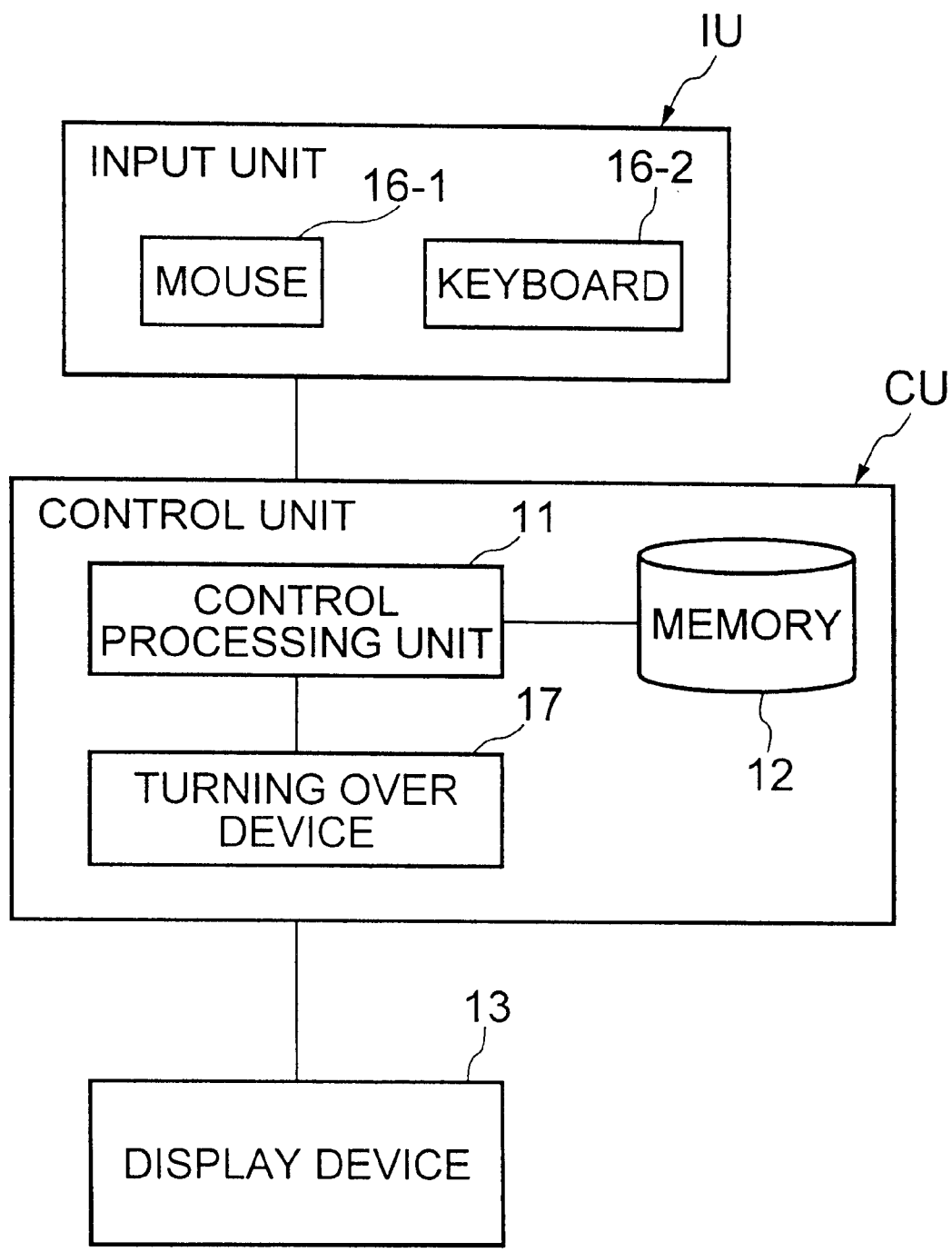
FIG. 1 is a schematic diagram showing a configuration of the multi-windows system according to the present invention.

More concretely, as shown in FIG. 1, in the system 10, the control unit CU includes a control processing unit 11 for controlling the components in the system 10, a memory 12 for storing data, commands, information, programs and the likes that are to he used for running the system 10.

The system 10 further includes a display device 13 for displaying a plurality of windows 14-1 to 14-n on a screen 15 thereof, with a multi-window fashion, i.e., a multiple of windows may be displayed as being superimposed one another, where n represents an integer indicating the number of windows that can be formed on the screen 15.

The input unit IU includes an input device 16 such as a mouse 16-1, a keyboard 162 and the likes for entering data, commands, information and the likes into the system 10.

Further, the control unit CU includes a turning over device 17 for turning over a first window that is laid over a second window among the plurality of windows 14-1 to 14-n. Herein, the first window is any window among the windows 14-1 to 14-n, that is laid over the second window that is immediately laid under the first window. More details of the turning over device 17 will be described later.

Figure 2:
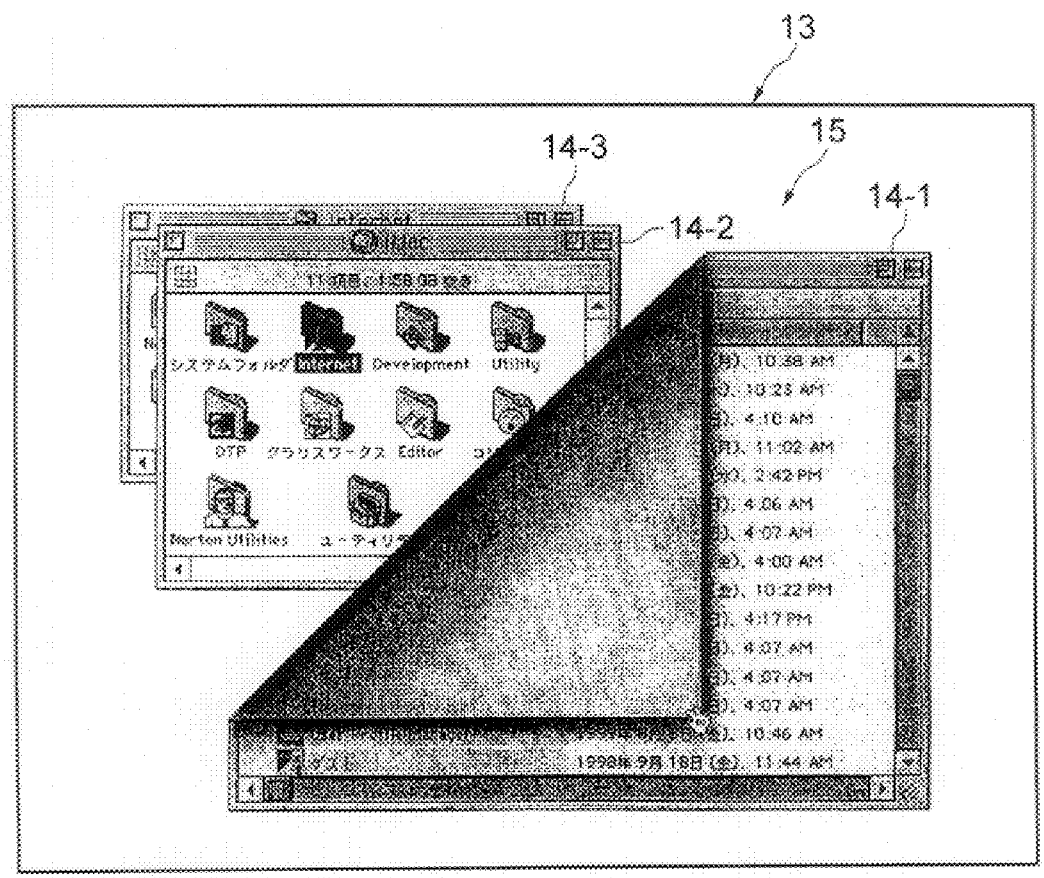
FIG. 2 is a diagram showing the details of the display device in FIG. 1.

FIG. 2 shows the details of the display device 13 in FIG. 1. On the screen 15 of the display device 13, there displays three windows 14-1 to 14-3, a hand-like shaped object 18 that functions as a guide for guiding the edges 14-1e to 14-3e of the windows 14-1 to 14-3 towards a fulcrum (not shown) and that is to be dragged toward the fulcrum by dragging the mouse 16-1 toward the fulcrum. The windows 14-1 to 14-3 as well as the object 18 are configured to function in accordance with the mouse 16-1 and/or the keyboard 16-2 so that whenever a button 16-1b of the mouse 16-1 or a shift key 16-2sk or a control key 16-2ck of the keyboard 16-2 is activated by pressing down, the windows 14-1 to 14-3 as well as the object 18 are functioned in such a manner that will be described below in more details.

Figure 3:
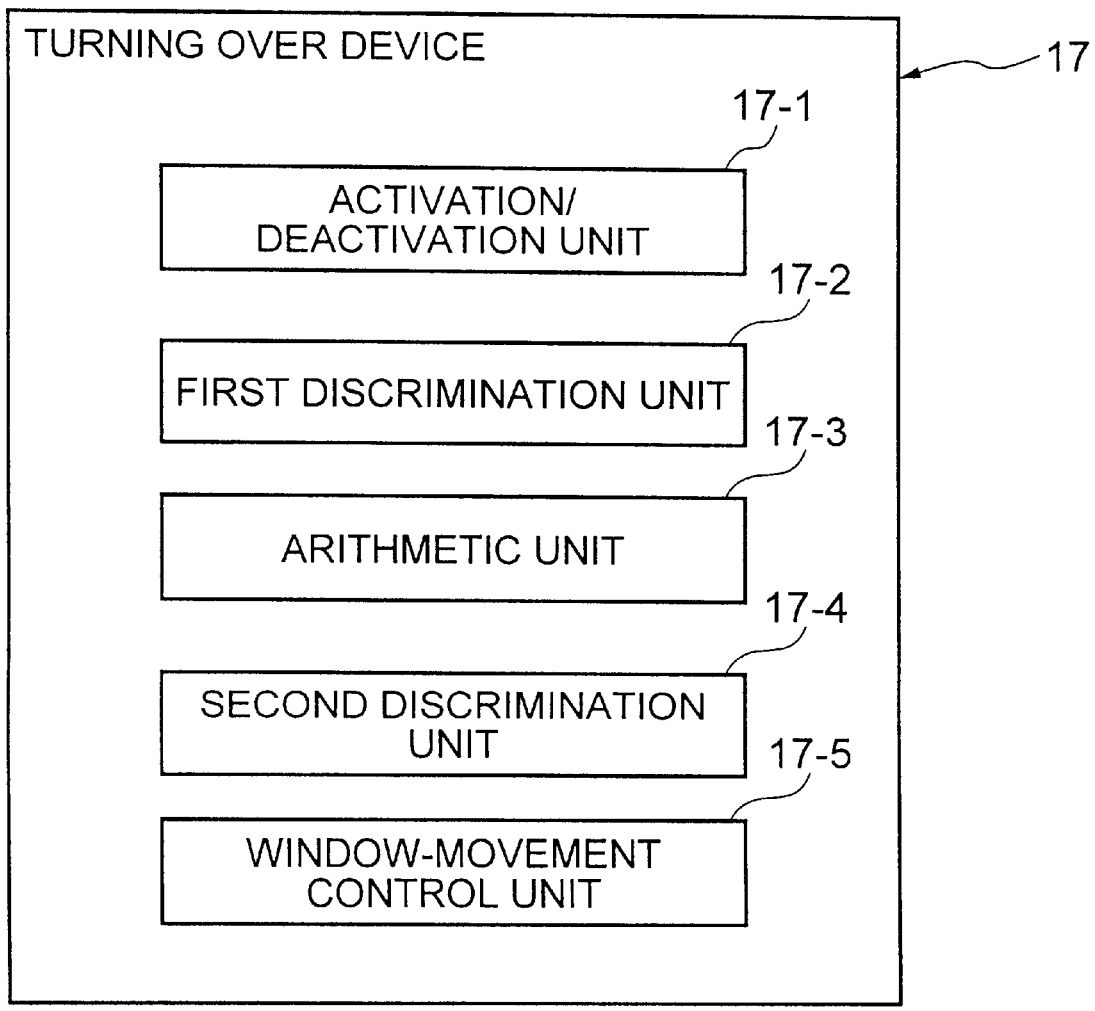
FIG. 3 is a diagram showing a detailed configuration of the turning over device according to the present invention, as shown in FIG. 1.

FIG. 3 shows the detailed configuration of the turning over device 17 according to the present invention, as shown in FIG. 1.

The turning over device 17 is constituted as an extended feature of a multi-windows type OS (Operating System). The turning over device 17 includes an activation/deactivation unit 17-1 for activating /deactivating an operation of a turn-over function with respect to a window on which the object 18 is placed; a first discrimination unit 17-2 for discriminating the activation made by the activation/deactivation unit 17-1; an arithmetic unit 17-3 for calculating an appropriate fulcrum in accordance with a result of the discrimination; a second discrimination unit 17-4 for discriminating a movement of the mouse 16-1, i.e., a movement of the object 18 as well as a movement of the shift key 16-2sk or a movement of the control key 16-2ck of the keyboard 16-2; and a window-movement control unit 17-5 for controlling a movement of the window subjected to be turned over among the windows 14-1 to 14-3. The arithmetic unit 17-3 further calculates an appropriate amount of turning over the window subjected to be turned over in accordance with the results of the first and second discrimination units 17-2 and 17-4. The scheme(s) used in the arithmetic unit 17-3 for calculating the amount of turning over will be described later in details.

Figure 4A:
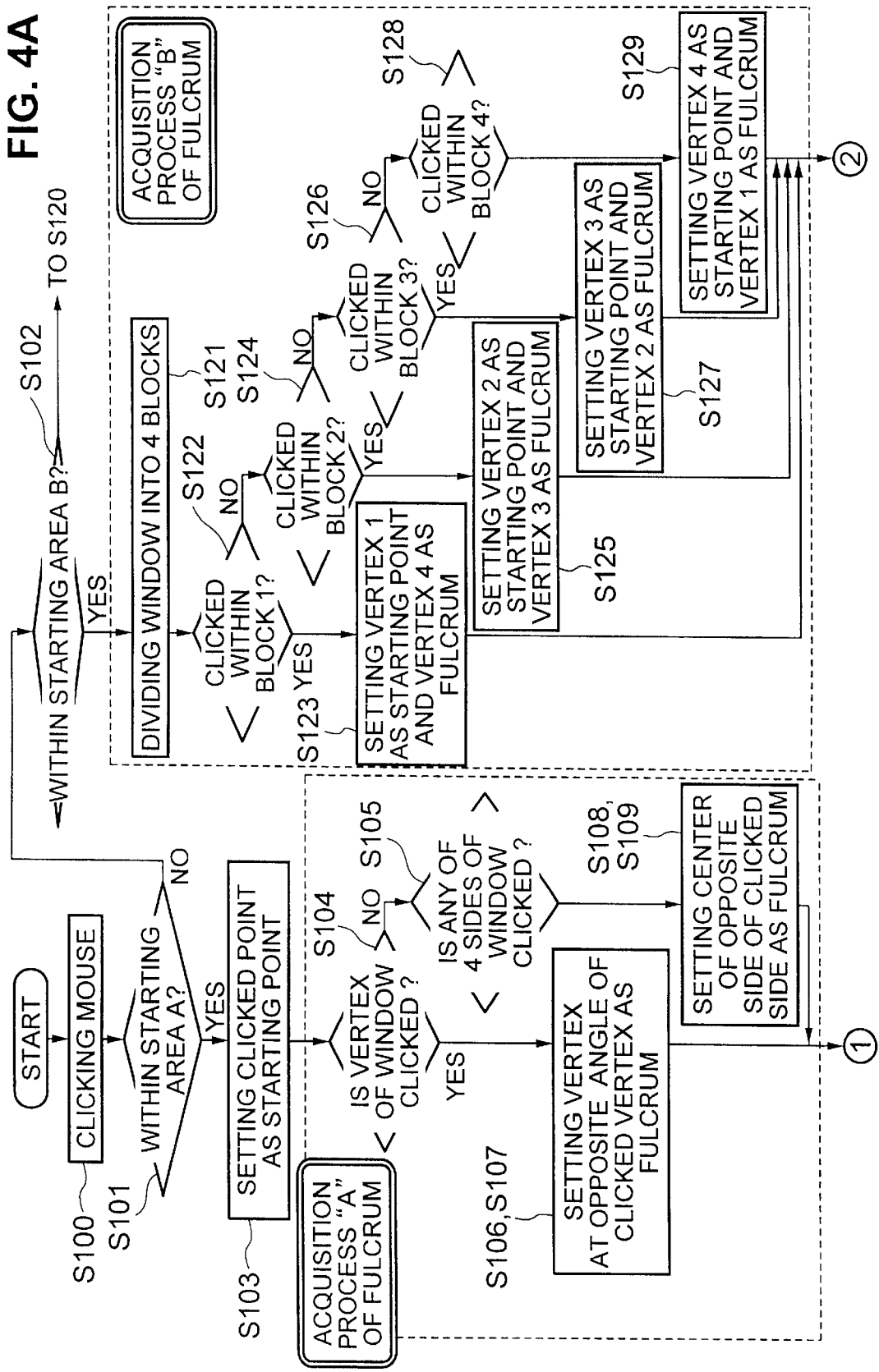
FIG. 4, constituted of FIGS. 4A and 4B, is a flow diagram illustrating the operation of the turning over device shown in FIGS. 1 and 3.
Figure 4B:
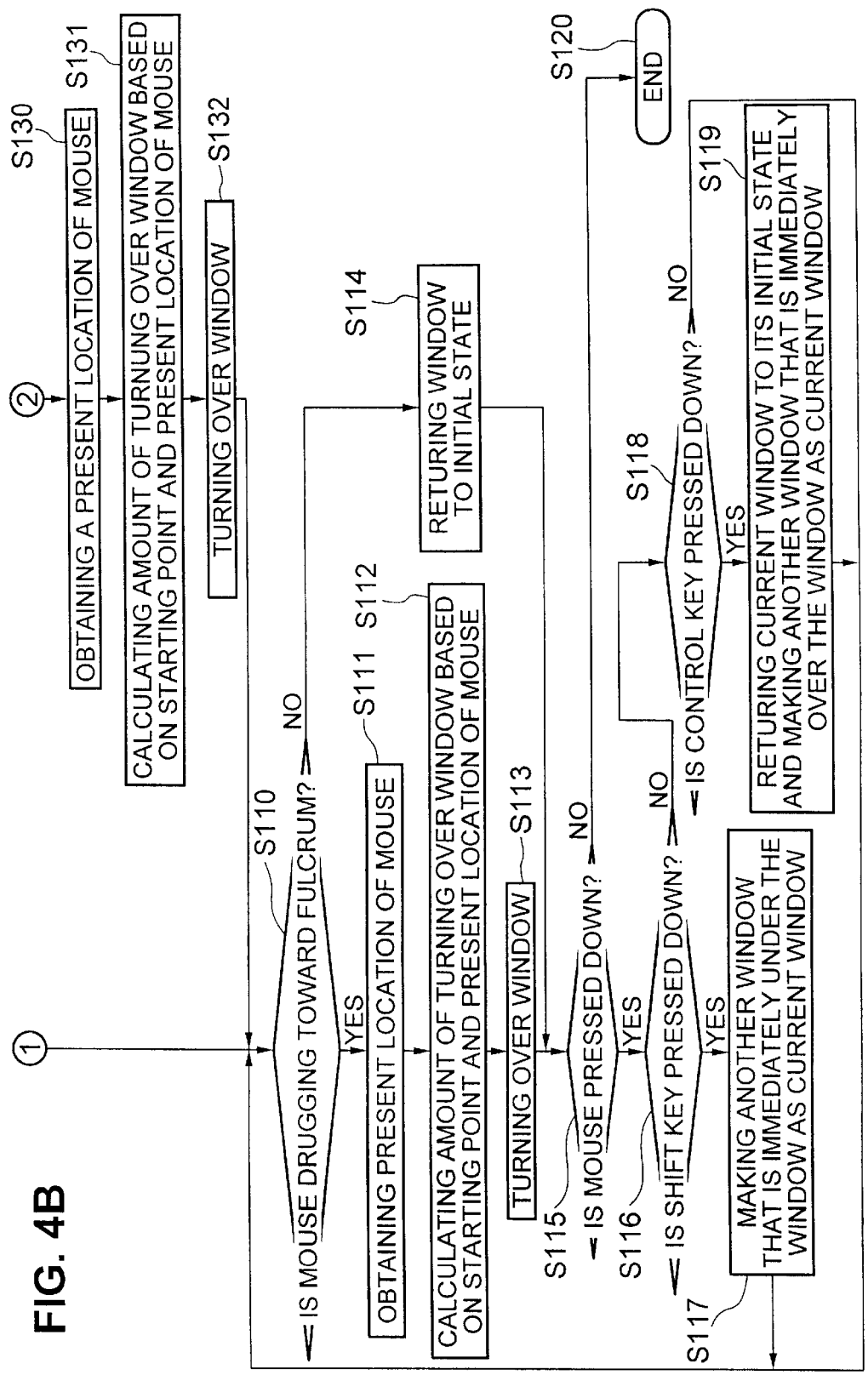

FIG. 4, constituted of FIGS. 4A and 4B, shows a flow diagram illustrating the operation of the turning over device 17 shown in FIGS. 1 and 3.

If one attempts to turn over the window 14-1 that is laid over the window 14-2 in order to peek a content of the window 14-2 that is laid under the window 14-1 at the system level of the Operating System (OS) in the multi-windows computer system 10, then at the first step, it is necessary to activate the activation/deactivation unit 17-1 of the turning over device 17 in order to start an operation of the turn-over function by clicking the button 16-1b of the mouse 16-1 in a starting area in the multi-windows system 10 (step S100).

As shown in FIG. 5, the starting area in the multi-windows system 10 may be either the starting area 19A or 19B, each of which is established on first window, respectively.

The discrimination unit 17-2 discriminates whether the clicking is made on the starting area 19A (step S101). If not, it further discriminates whether the clicking is made on the starting area 19B (step S102). If the clicking is not made on the starting area 19B at the step S102, then proceeds to the step 120 so as to terminate the process.

If the clicking is made on the starting area 19A at the step S101, then the clicked point is set as a starting point (step S103). Then it is determined whether the clicking is made at any corner of the window 14-1 (step Si04) or any side of the window 14-1 (step S105).

If the mouse 16-1 is clicked at a corner CN-1 of the window 14-1 (step S106), then on the screen 15 of the display device 13, the CPU 11 sets, as a fulcrum FC, a point Pi at which two lines L1, L2 cross at right angles to each other in a right triangle RT such that a hypotenuse H thereof is formed by a diagonal from the clicked corner CN-1 to an opposite corner CN-2 thereof in accordance with the result calculated by the arithmetic unit 17-3 (step S107).

On the other hand, if the mouse 16-1 is clicked at a side SD-1 of the window 14-1 (step S108), then the CPU 11 sets, as the fulcrum FC, a center CT of an opposite side SD-2 of the clicked side SD-1 in accordance with the result calculated by the arithmetic unit 17-3 (step S109), then proceed to the S110.

In the following, it is assumed that the mouse 16-1 is clicked at the corner CN-1 of the window 14-1 as described in the above step S106 in order to clarify the description, but the following steps are applicable for the case in which the clicking is made on the starting area 19B, as can be seen from FIG. 4. This will be described later.

Then, the discrimination unit 17-4 discriminates whether or not the mouse 16-1 is being dragged toward the fulcrum FC (i.e., the point Pi in this case) (step S110).

If the mouse 16-1 is being dragged toward the fulcrum FC in the step S110, then the arithmetic unit 17-3 obtains a present location of the mouse 16-1 (step S111), and calculates an appropriate amount of turning over the window 14-1 based on the starting point and the present location of the mouse 16-1 (step S112), and then the window-movement control unit 17-5 turns over the window 14-1 toward the fulcrum FC in sequential movements so that window 14-1 is animated as if it is being rolled in a pseudo-three dimensional manner to unveil the window 14-2 that is laid under the window 14-1 (step S113), and then proceeds to the step S115. These schemes for calculating an amount of turning over the window may be stored in the memory 12 in the form of a program, for example. These schemes will be described later in more detail.

On the other hand, if the mouse 16-1 is not dragged toward the fulcrum FC in the step S110, then the window-movement control unit 17-5 returns the window 14-1 to its initial state so as to veil the window 14-2 as it has been laid under the window 14-1 (step S114), and then proceeds to step S115.

Further, the discrimination unit 17-4 discriminates whether or not the button 16-1b of the mouse 16-1 is pressed down (step S115).

If the button 16-1b of the mouse 16-1 is being pressed down at the step S115, then the discrimination unit 17-4 further discriminates whether or not the shift key 16-2sk of the keyboard 16-2 is pressed down (step S116).

If the shift key 16-2sk is pressed down at the step S116, then the window-movement control unit 17-5 turns over the window 14-2 so as to unveil the window 14-3 that is laid under the window 14-2 and makes the window 14-3 that is immediately under the window 14-2 as a current window (step S117), and then returns to the step S110.

On the other hand, if the shift key 16-2sk is not pressed down at the step S116, then the discrimination unit 17-4 discriminates whether or not the control key 16-2ck of the keyboard 16-2 is pressed down (step S118).

If the control key 16-2ck is pressed down at the step S118, then the window-movement control unit 17-5 returns the window 14-2 to its initial state so as to veil the window 14-3 as it has been laid under the second window 14-2, and changes the window 14-2 that is laid over the window 14-3 as a current window (step S119), and then returns to the step S110.

On the other hand, if the control key 16-2ck is not pressed down at the step SI 18, it returns to the step S110.

The above described steps S110 through S119 are repeated for the subsequent windows that are laid under the window 14-3, if there is any window being laid under the window 14-3. Then, if the button 16-1b of the mouse 16-1 is not pressed down at the step S115, the operation of the turn-over function is terminated (S120).

Now, the situation in which the clicking is made on the starting area 19B at the step S102 will be described. If the clicking is made on the starting area 19B at the step S102, then the window 14-1 is divided into 4 blocks as the blocks 1, 2, 3 and 4, respectively as shown in FIG. 5 (step S121).

Then, it is determined whether the clicking is made on the block 1 of the window 14-1 (step S122). If so, the vertex I is set as a starting point as well as the vertex 4 is set as a fulcrum (step S123). On the other hand, if not at the step S122, then it is determined whether the clicking is made on the block 2 of the window 14-1 (step S124). If so, the vertex 2 is set as a starting point as well as the vertex 3 is set as a fulcrum (step S125). On the other hand, if it is not at the step S124, then it is determined whether the clicking is made on the block 3 of the window 14-1 (step S126). If so, the vertex 3 is set as a starting point as well as the vertex 2 is set as a fulcrum (step S127). On the other hand, if it is not at the step S126, then it is determined whether the clicking is made on the block 4 of the window 14-1 (step S128). If so, the vertex 4 is set as a starting point as well as the vertex 1 is set as a fulcrum (step S129). If not, then it proceeds to the step 120 so as to terminate the process.

Then, the arithmetic unit 17-3 obtains a present location of the mouse 16-1 (step S130), and calculates an appropriate amount of turning over the window based on the starting point and the present location of the mouse 16-1 (i.e., the present location of the object 18) (step S131), and then the window-movement control unit 17-5 turns over the window 14-1 toward the fulcrum FC in sequential movements so that window 14-1 is animated as if it is being rolled in a pseudo-three dimensional manner to unveil the window 14-2 being laid under the window 14-1 (step S132). Then it proceeds to the step S 110 as described above.

The arithmetic unit 17-3 calculates an appropriate fulcrum in accordance with the following schemes.

(1) In Case of Starting Area 19A

If the mouse 16-1 is clicked on any side of the four sides other than a vertex or a corner (or a crossing point of two sides) of the starting area 19A to set a starting point of an operation, the starting point is a point at where the mouse 16-1 is clicked, and a middle point of an opposite side with respect to the side on which the mouse 16-1 was clicked is set to be a fulcrum of the operation thereof (i.e., a direction at which a first window is turned over).

On the other hand, if the mouse 16-1 is clicked on a vertex or a corner (i.e., a crossing point of two sides) of the starting area 19A to set a starting point of an operation, an opposite angle thereof is set to be a fulcrum of the operation thereof.

(2) In Case of Starting Area 19B

If the mouse 16-1 is clicked on any block of the four blocks, a vertex of that block on which the mouse 16-1 was clicked is set to be a starting point of an operation, and a vertex of a corner located at an opposite angle of the block on which there is the starting point is set to be a fulcrum of the operation thereof.

In the following an operation of the above-mentioned case (1) will be described in detail. Since an operation of the above-mentioned case (2) is the same as the one for the above-mentioned case (1), only the operation of the above-mentioned case (1) will be described below.

When an operator has started to drug the mouse 16-1 toward a direction of a fulcrum, the arithmetic unit 17-3 immediately calculates an amount of a turning over for a first window based on the data of a location of a starting point and a present location of the mouse 16-1 with the following equation:

$$ATO=(STP-PLM) \times m$$

and then the window is turned over promptly with the amount that is just calculated by the arithmetic unit 17-3 as described above.

Figure 6:
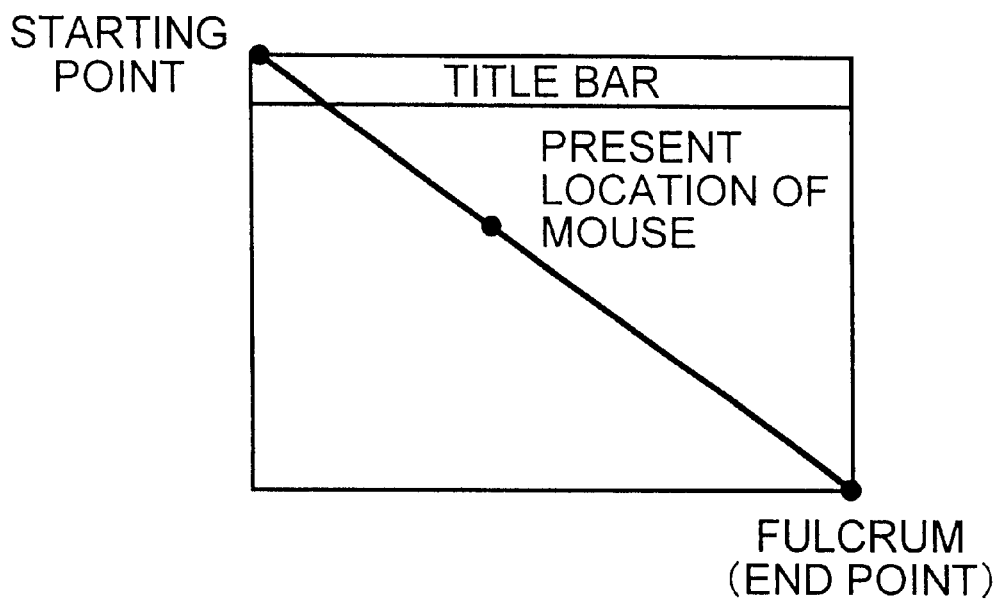
FIG. 6 is a diagram showing a present location of a object (PLM)

In the above equation, ATO represents the amount of the turning over for the window, STP represents the starting point of the turning over, PLM represents the present location of the mouse 16-1 (i.e., the present location of the object 18), and m represents a coefficient of either 1 or 2. Herein, the PLM is set as a point at where a straight line L1 that is perpendicular to a straight line L2 connecting the starting point and the fulcrum intersects with the straight line L2, as shown in FIG. 6.

In the case of m=1, a first window, for example the window 14-1 is turned over with an amount equal to the dragged amount of the mouse 16-1, and in the case of m=2, the window 14-1 is turned over with an amount equal to twice of the dragged amount of the mouse 16-1. Herein, a value of m is set as an optional so that a user or an operator can set the value of m as to be 1 or 2.

As the window is displayed on a full screen, in the setting of m=1, the window can be turned over only up to about a half of a full size of the window, but in the setting of m=2, the window can be turned over up to a full size of the window.

Furthermore, in the setting of m=1, the window is turned over as if a turn-over end of the window is pulled up with the cursor-pointer, and in the setting of m=2, the window is turned over as if a border of the window, which is being turned over, is pulled up with the cursor-pointer.

The above steps S101 through S132 may also be applicable to turn over a window at any level in the multi-leveled windows 14-1 to 14-n. For instance, if one desires to turn over the window 14-7, then all of the windows (14-1 to 14-6) being laid above the window 14-7 A are turned over at once in the similar manner as described above. In this case, a middle point on a side that is situated at the farthest distance among the windows 14-1 to 14-n is set to be a fulcrum.

In the present embodiment, the widow such as the window 14-2 that is currently displayed on the screen 15 may be activated by clicking the button 16-1b of the mouse 16-1 so that the window 14-2 can be edited as altering a portion of the content thereof, erasing a portion of the content, adding something to the content, or altering or erasing an entire content of the window, and the likes.

Moreover, in the present embodiment, a reversed side of the turned-over window 14-1, may include its own content such as an advertisement, information, with a black colored back-screen or a white colored back-screen and the likes.

As having mentioned above, the method of turning over a window of the present invention is preferably constituted as a program that functions at a system level of any kind of an Operating System (OS), it may be used in various situations.

In the following, as the preferred embodiments of the operations of the system for turning over a window according to the present invention, a couple of such situations will be described with reference to the accompanying drawings. In these situations, the movement(s) of turning over the window(s) in these embodiments are all displayed on the screen 15 of the display device 13 in the animation of the pseudo-three dimensional fashion, as described above.

Figure 7:
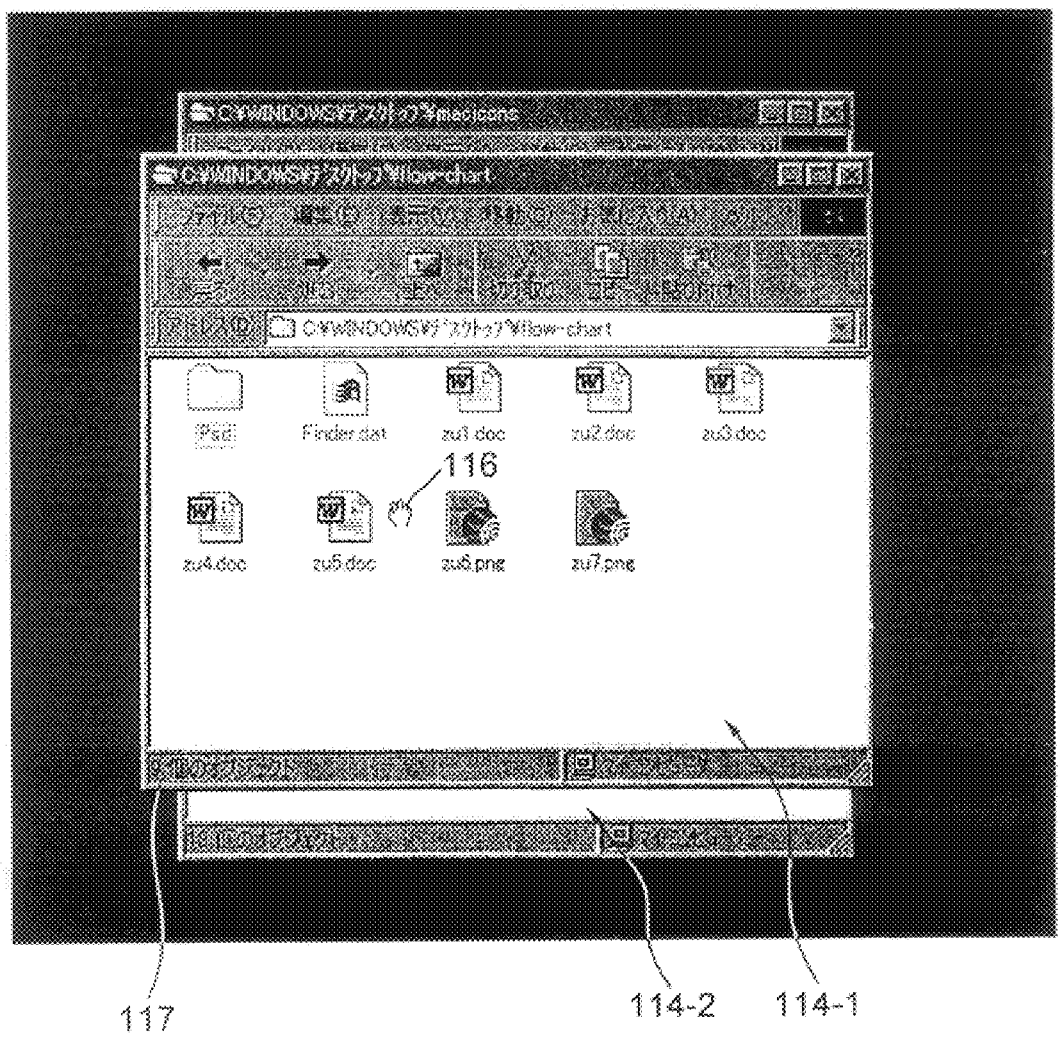
FIGS. 7–9 are drawings for illustrating one embodiment of the operations of the system for turning over the window according to the present invention.
Figure 8:
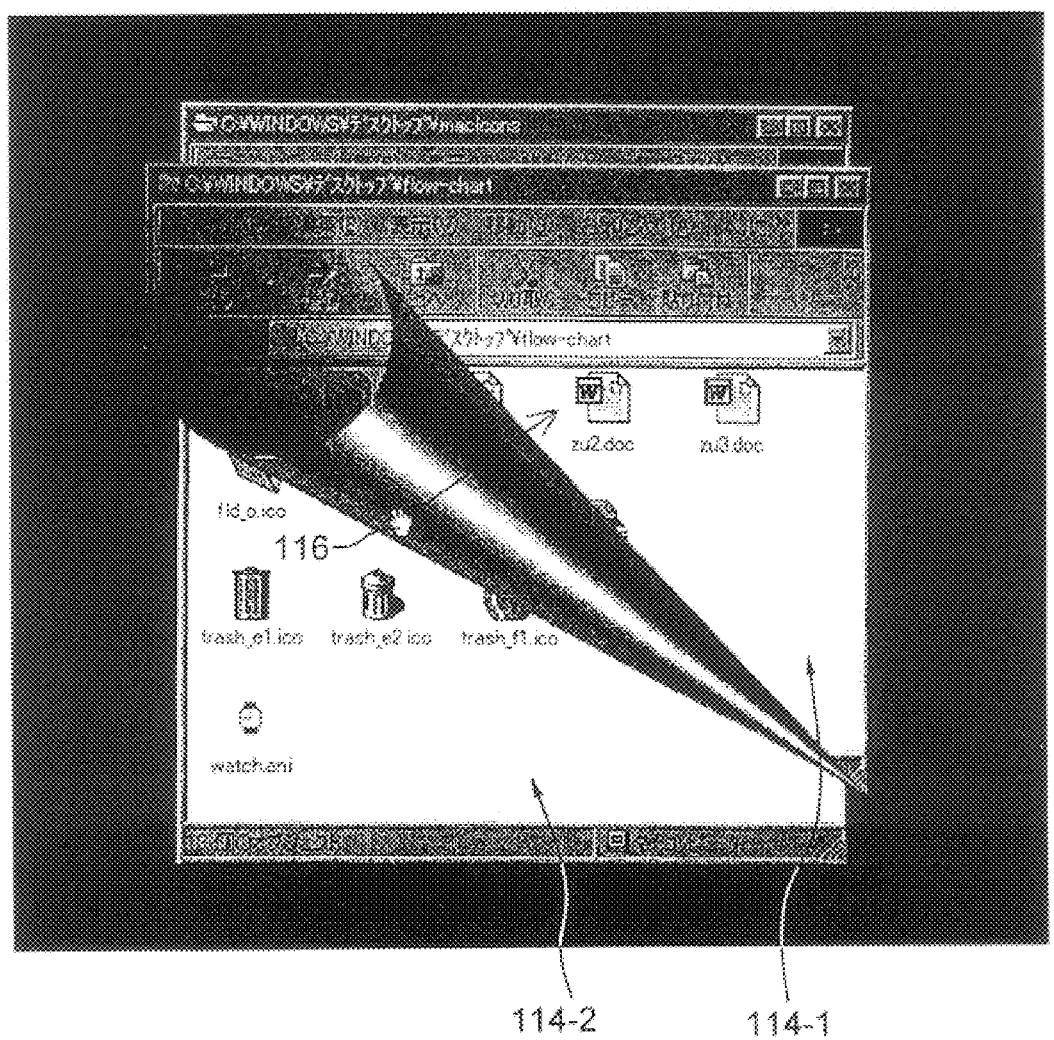
Figure 9:
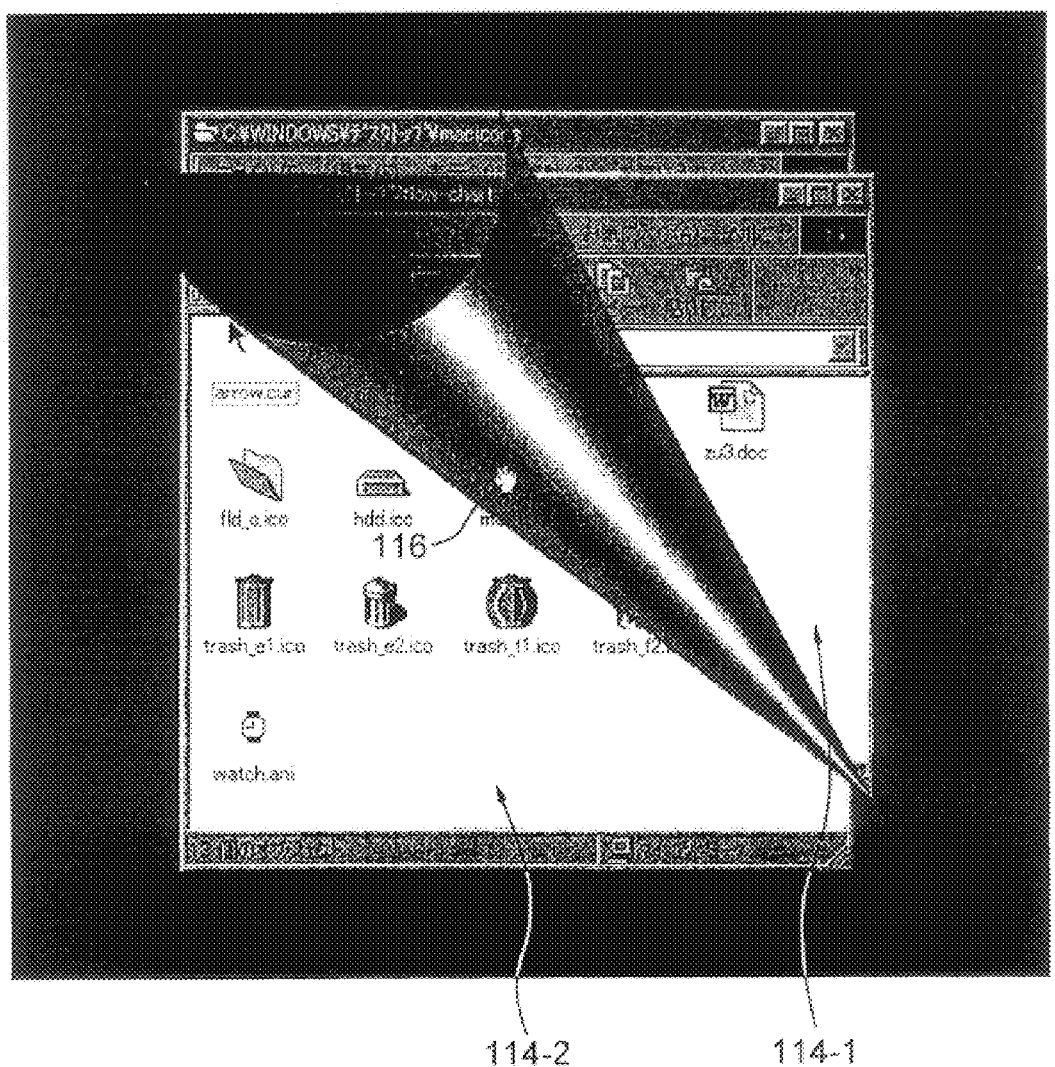

FIGS. 7~9 illustrate the operations of the system for turning over a window for the holder window of the Windows 98 OS, as one of such situations.

In this case, two layers of the windows 114-1 and 114-2 are displayed on the screen 15 of the display device 13, and the method is to be operated as starting from a location at where a hook-hand object 116 is placed as shown in FIG. 7.

Clicking the mouse 16-1 while pressing down an optional key (such as the "Shift" key or the "Alt" key), then the lower left end 117 of the window 114-1 is turned over to an area which is pointed by the mouse 16-1 so as to unveil the portion of the window 114-2 that was laid under the window 114-1, as shown in FIG. 8.

Then, dragging the hook-hand object 116 in an upper right direction (shown in an arrow in the figure), the window 114-1 is further turned over so as to further unveil the portion of the window 114-2, as shown in FIG. 9.

Figure 10:
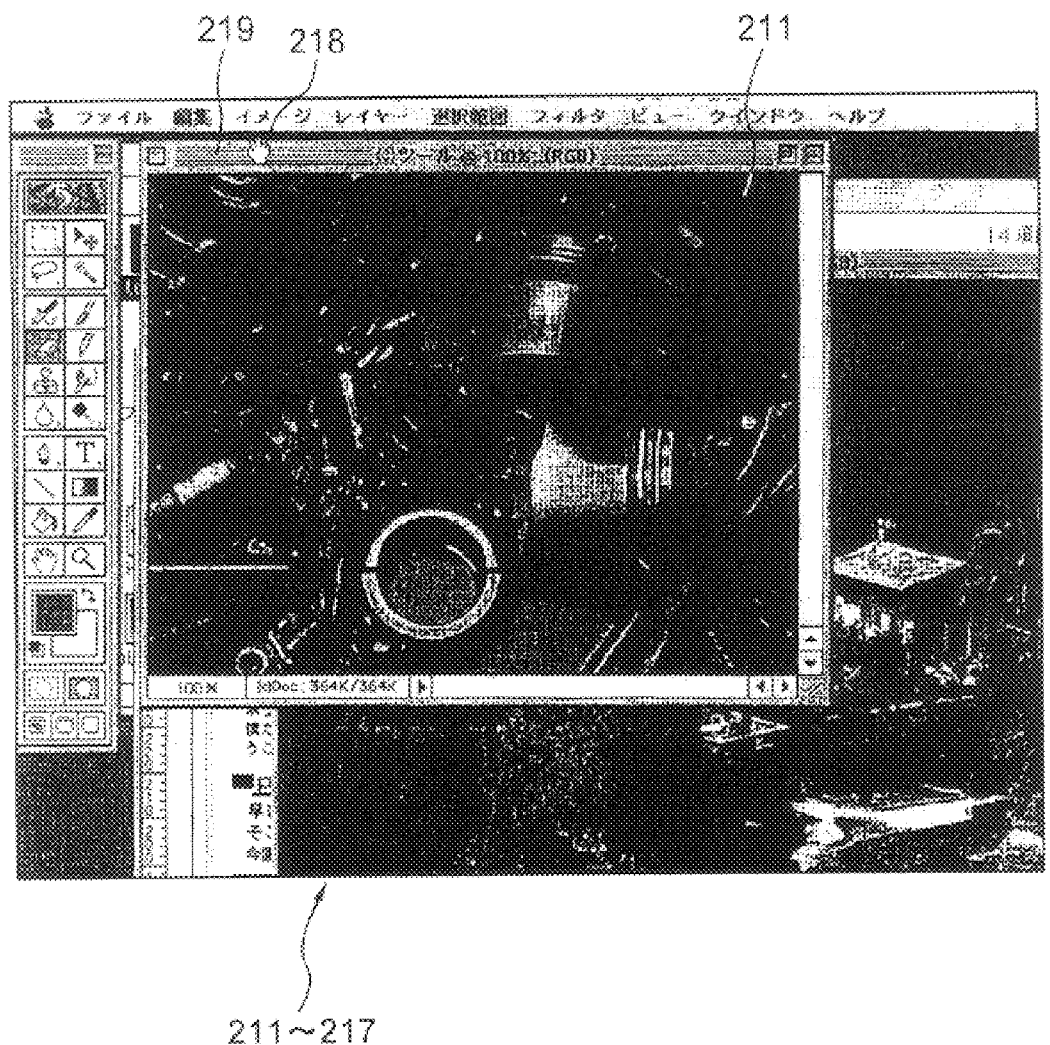
FIGS. 10–11 are drawings for illustrating another embodiment of the operations of the system for turning over the window according to the present invention.
Figure 11:
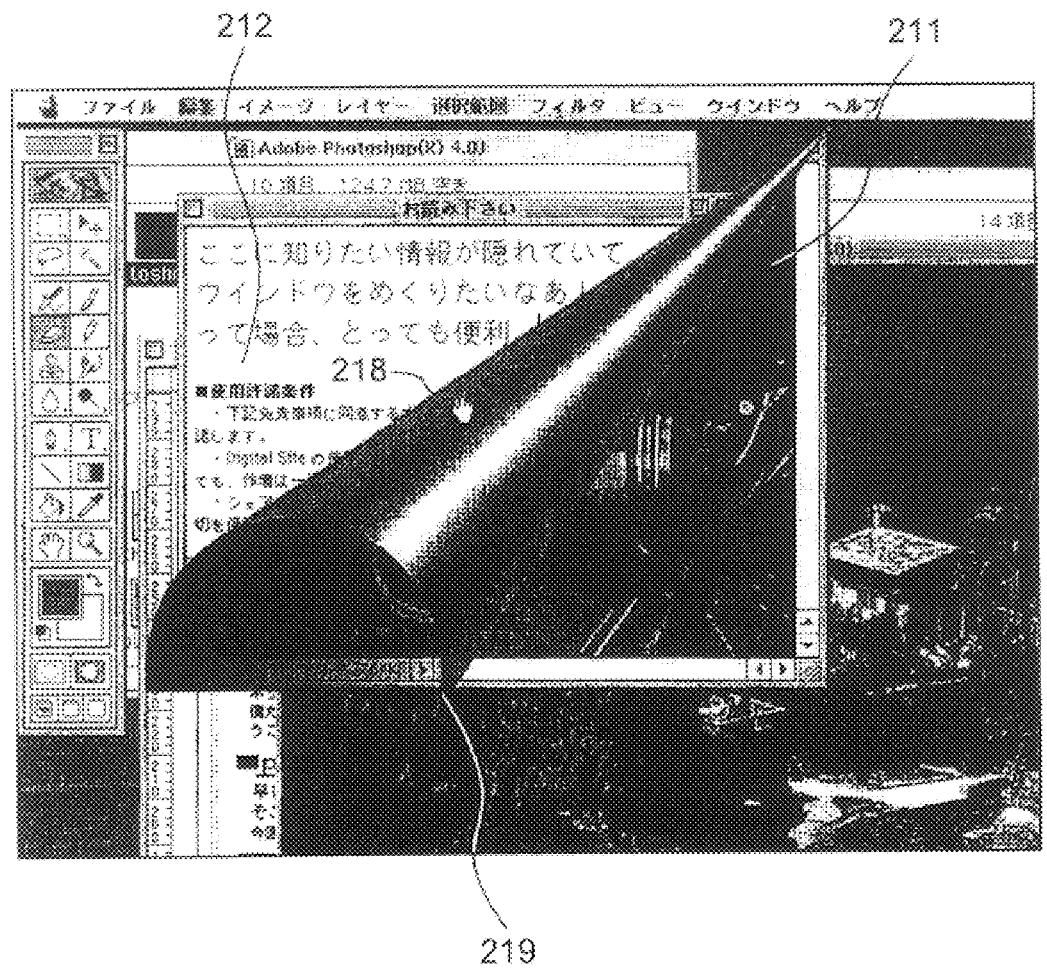

FIGS. 10~11 illustrate the operations of the system for turning over a window for the Adobe Photoshop of the MacOS, as another one of such situations.

In this case, at least seven layers of the windows 211~217 are displayed on the screen 15 of the display device 13, and the method to be operated starts from a location at where a hook-hand object 218 is placed as shown in FIG. 10. Then, the hook-hand object 218 grabs the upper left portion 219 of the window 211, and just starts to turn over the window 211 toward the lower right direction as indicated by an arrow.

As a result of the above described operations, as clicking the mouse 16-1 while pressing down an optional key (such as the "Shift" key or the "Alt" key), then the upper left portion 219 of the window 211 is turned over so as to unveil the portion of the window 212, as shown in FIG. 11.

Figure 12:
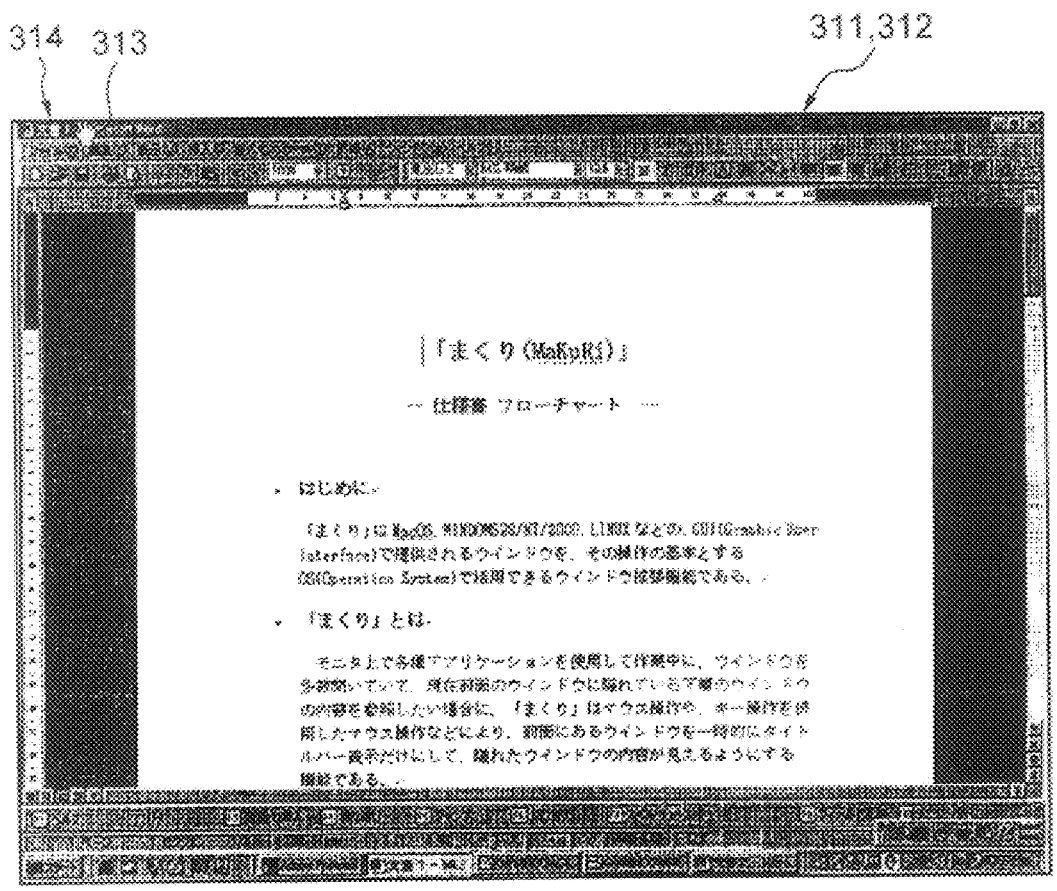
FIGS. 12–13 are drawings for illustrating yet another embodiment of the operations of the system for turning over the window according to the present invention.
Figure 13:
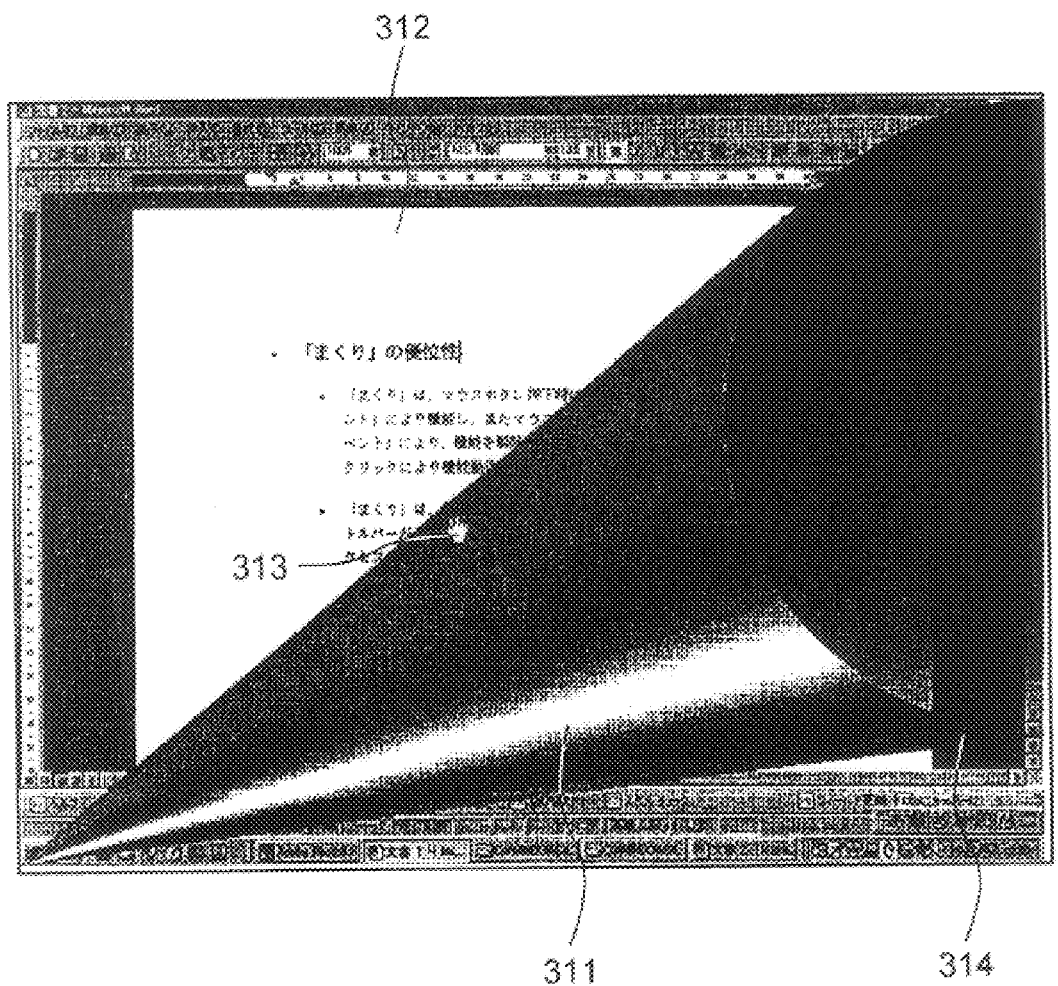

FIGS. 12~13 illustrate the operations of the system for turning over a window for the Word 2000 of the Windows 98, as another one of such situations.

In this case, two layers of the windows 311, 312 are displayed on the screen 15 of the display device 13, and the method to be operated starts from a location at where a hook-hand object 313 is placed as shown in FIG. 12. Then, the hook-hand object 313 grabs the upper left portion 314 of the window 311, and just starts to turn over the window 311 toward the lower right direction.

As a result of the above described operations, as clicking the mouse 16-1 while pressing down an optional key (such as the "Shift" key or the "Alt" key), then the upper left portion 314 of the window 311 is turned over so as to unveil the portion of the window 312, as shown in FIG. 13.

Figure 14:
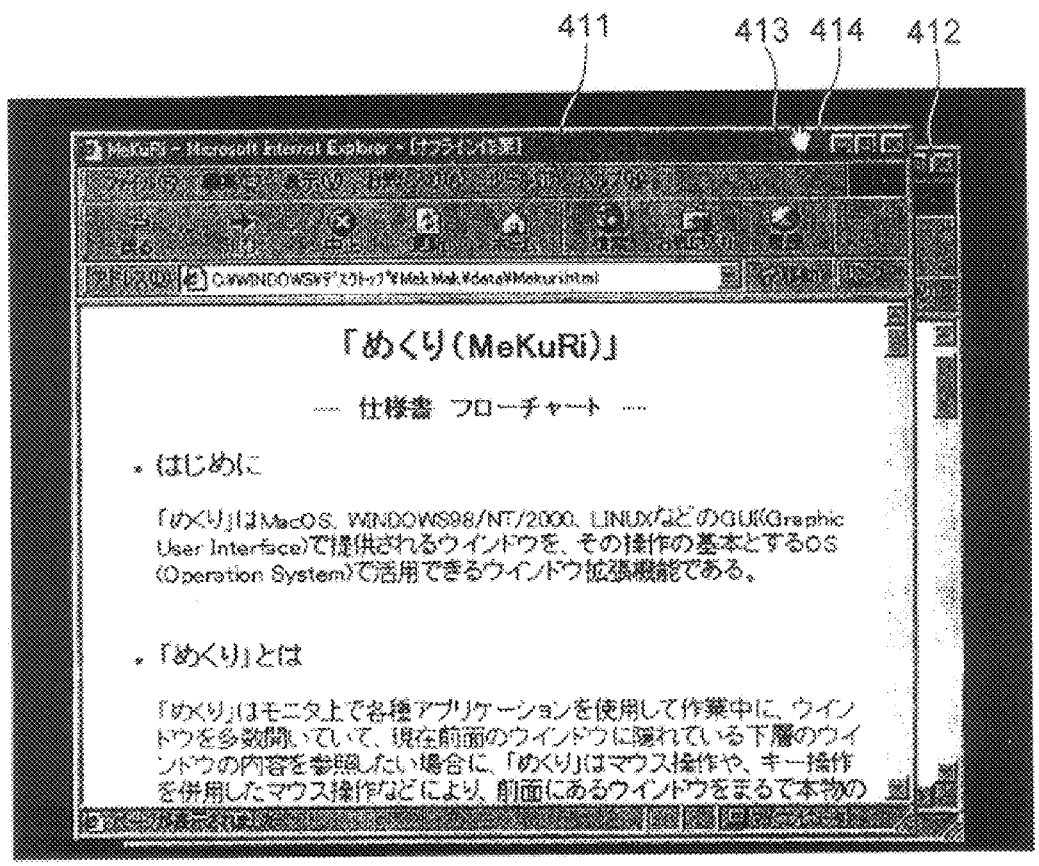
FIGS. 14–15 are drawings for illustrating another embodiment of the operations of the system for turning over the window according to the present invention.
Figure 15:
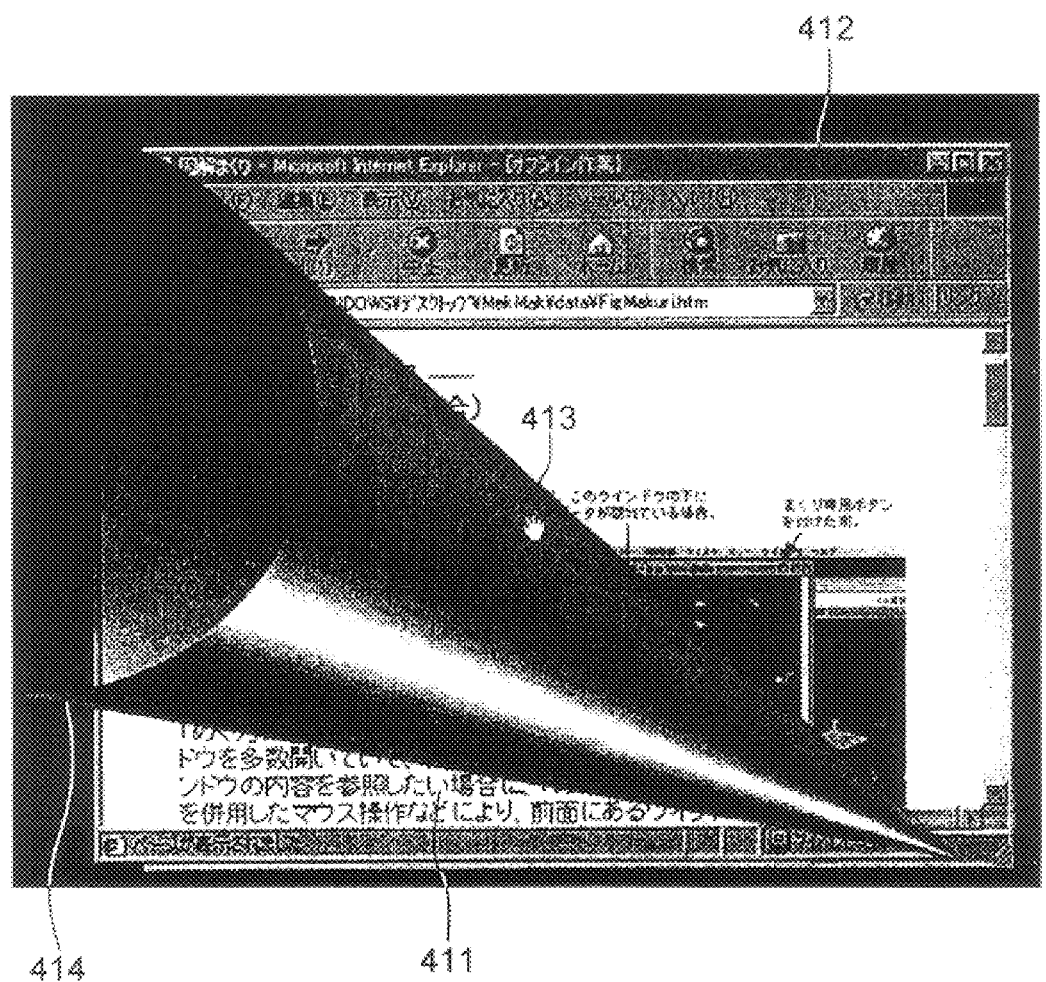

FIGS. 14~15 illustrate the operations of the system for turning over a window for the Internet Explorer of the Windows 98, as another one of such situations.

In this case, two layers of the windows 411, 412 are displayed on the screen 15 of the display device 13, and the method to be operated starts from a location at where a hook-hand object 413 is placed as shown in FIG. 14. Then, the hook-hand object 413 grabs the upper right portion 414 of the window 411, and just-starts to turn over the window 411 toward the lower left direction.

As a result of the above described operations, as clicking the mouse 16-1 while pressing down an optional key (such as the "Shift" key or the "Alt" key), then the upper right portion 414 of the window 411 is turned over so as to unveil the portion of the window 412, as shown in FIG. 15.

Figure 16:
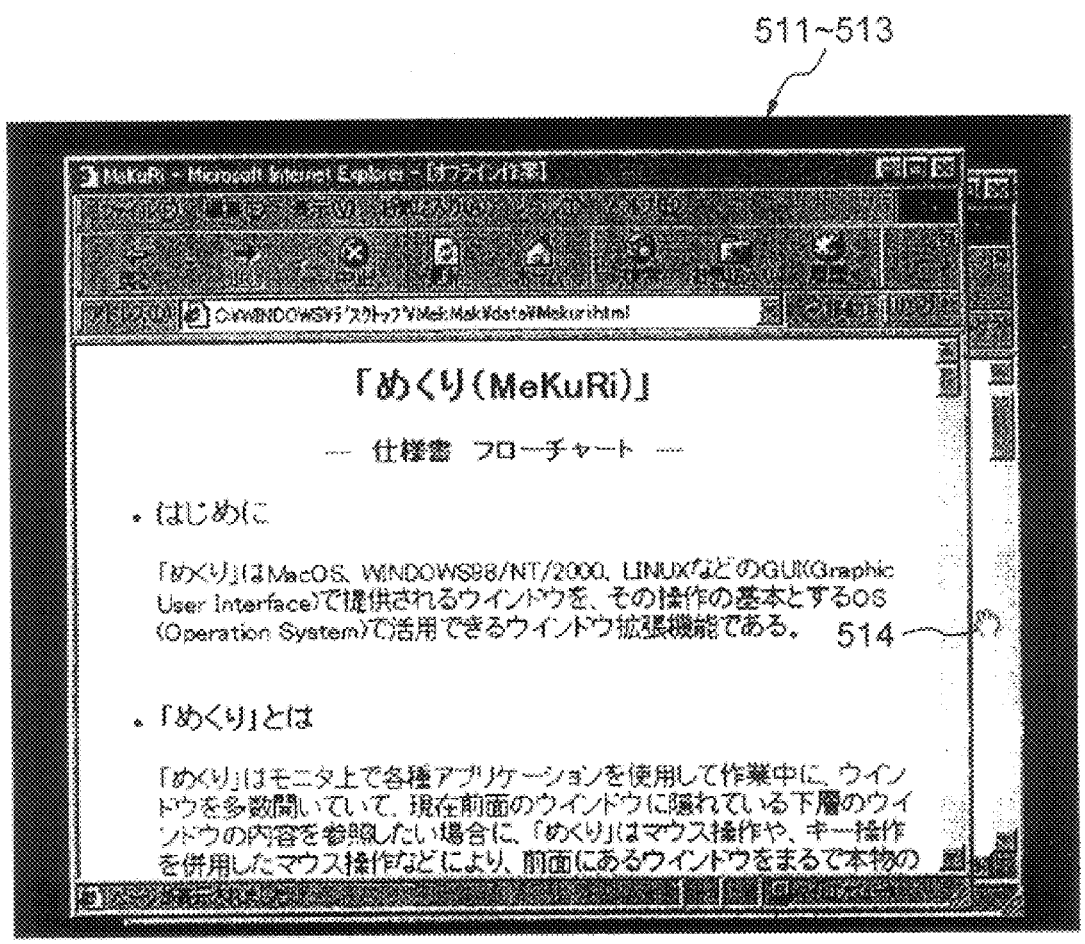
FIGS. 16–18 are drawings for illustrating another embodiment of the operations of the system for turning over the window according to the present invention.
Figure 17:
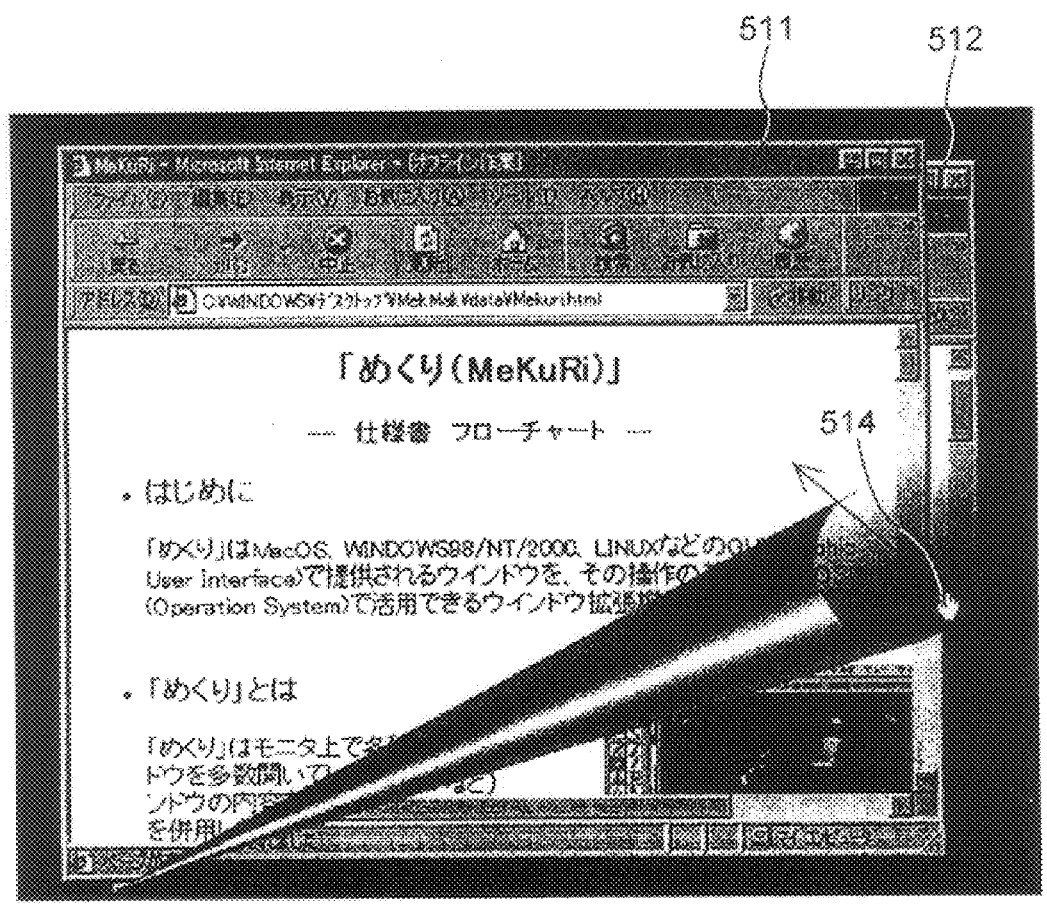
Figure 18:
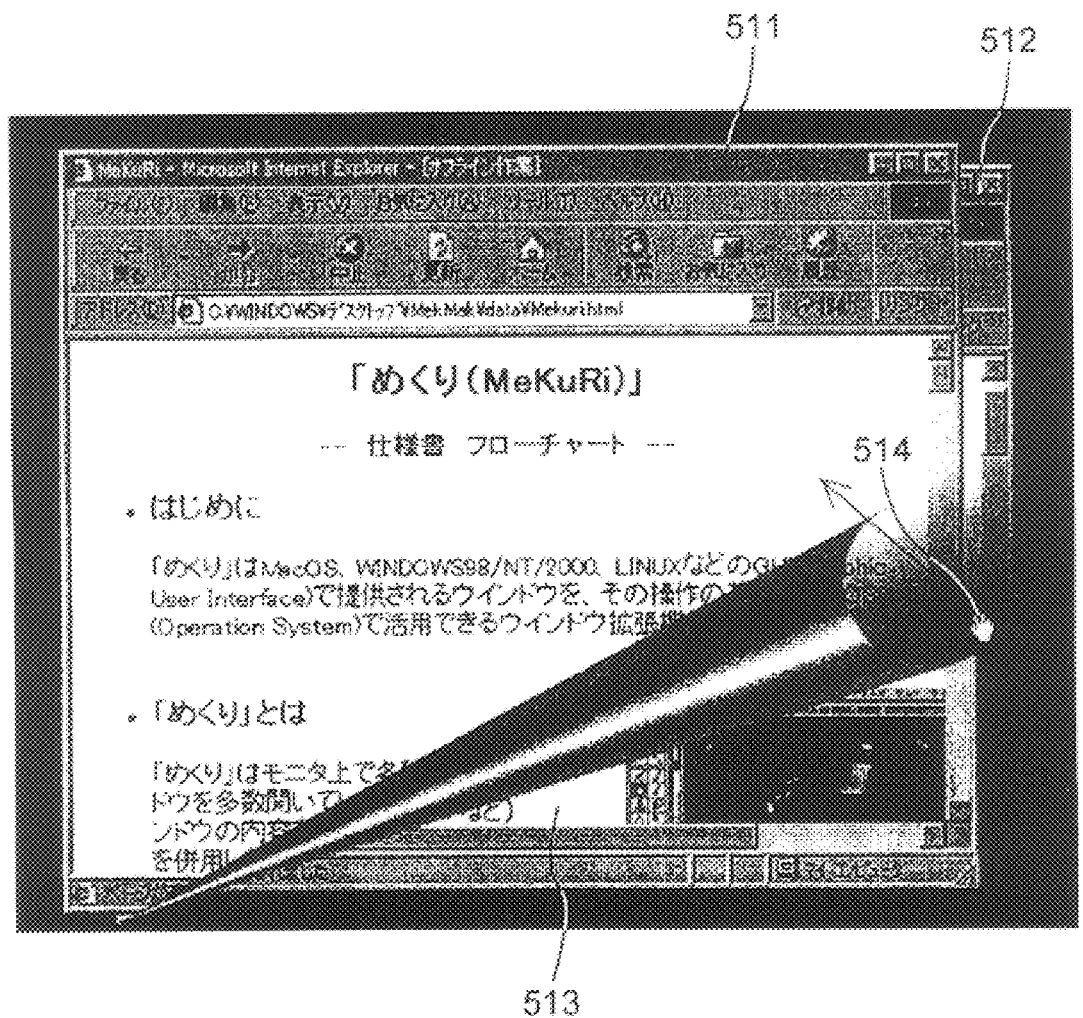

FIGS. 16~18 illustrate the operations of the system for turning over a window for the Internet Explorer of the Windows 98, as another one of such situations.

In this case, three layers of the windows 511~513 are displayed on the screen 15 of the display device 13, and the method to be operated starts from a location at where a hook-hand object 514 is placed on the right end side of the window 512 that is laid under the window 511 as shown in FIG. 16. Then, the lower right end 515 of the window 512 starts to be turned over toward a direction as indicated by an arrow so as to unveil the portion of the window 513 that was laid under the window 512 as shown in FIG. 17.

Then, dragging the hook-hand object 514 in the direction indicated by the arrow, the window 512 is further turned over so as to further unveil the portion of the window 513, as shown in FIG. 18.

As can be seen from the above-described embodiments, the direction of turning over the window is in the direction diagonal from the starting point toward the fulcrum. However, the various modifications and alternations can be made regarding the direction of turning over the window so long as the starting point and the fulcrum A are established in the manner as described above although the diagonal direction is the most preferable in the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. A method of turning over a window that is laid over another window in a multi-window computer system, in order to peek in a pseudo-three dimensional manner at a content of said another window that is laid under said window, said method comprising the steps of:

(a) selecting a first window from said multi-windows by placing an object on said first window;

(b) clicking said object on said first window to initiate an operation of turning over; and (c) dragging said object toward a direction to which said first window is to be turned over so as to unveil a second window that is laid under said first window, whereby enabling to peek at a content of said second window;

wherein said step (b) further comprises the steps of:
   (b-1) clicking said object by placing it at any location on an appropriate area of said first window so as to start an operation of a turn-over function;
   (b-2) evaluating a first location on said first window where said clicking is made; and
   (b-3) setting an appropriate fulcrum in accordance with a result of said evaluation step;

wherein said step (c) further comprises the steps of:
   (c-1) evaluating whether or not said object is dragged toward said fulcrum;
   (c-2) if said object is dragged to a second location on said first window toward said fulcrum in the step (c-1), then calculating an amount of turning over said first window based on said first location and said second location; and
   (c-3) turning over said first window toward said fulcrum in sequential manner in accordance with said calculated amount of turning over so that a movement of said first window is animated as if it is being rolled in a pseudo-three dimensional manner to unveil said second window that is laid under said first window.

2. A method of turning over a window according to claim 1, further comprising the step of:
   (d) inactivating said operation of turning to put said first window in an initial state thereof, thereby veiling said second window as being laid under said first window.

3. A method of turning over a window according to claim 1, wherein said appropriate area is any part of a frame of said first window, and wherein said step (b-3) includes at least one of the steps of:
   (b-3-1) if it is clicked at a corner of said first window in the step (b-3), then as said fulcrum, setting a point at which two lines intersect at right angle to each other in a right triangle such that a hypotenuse thereof is formed by a diagonal from said clicked corner to an opposite corner thereof; and
   (b-3-2) if it is clicked at a side of said first window in the step (b-3), then as said fulcrum, setting a center of an opposite side of said clicked side.

4. A method of turning over a window according to claim 1, wherein said appropriate area consists of a plurality of blocks, said plurality of blocks covering an entire area of said first window.

5. A method of turning over a window according to claim 4, wherein said appropriate area consists of four blocks, said four blocks covering an entire area of said first window, and wherein said four blocks include a first block having a first vertex of said first window, a second block having a second vertex of said first window, and a third block having a third vertex of said first window, and a fourth block having a fourth vertex of said first window, wherein said step (b-3) includes any one of the steps of:
   (b-3-1) if it is clicked on said first block in the step (b), setting said first vertex as a starting point and setting said fourth vertex as said fulcrum; (b-3-2) if it is clicked on said second block in the step (b), setting said second vertex as a starting point and setting said third vertex as said fulcrum; (b-3-3) if it is clicked on said third block in the step (b), setting said third vertex as a starting point and setting said second vertex as said fulcrum; and (b-3-4) if it is clicked on said fourth block in the step (b), setting said fourth vertex as a starting point and setting said first vertex as said fulcrum.

6. A system for turning over a window that is laid over another window in a multi-windows computer system, in order peek in a pseudo-three dimensional manner at a content of said another window that is laid under said window, said system comprising:
  (a) an input means for selecting a first window from said multi-windows by placing an object on said first window, and for clicking said object on said first window to initiate an operation of turning over; and
  (b) a control means for controlling said operation of turning over in accordance with said input means by dragging said object toward a direction to which said first window is to be turned over so as to unveil a second window that is laid under said first window, whereby enabling to peek at a content of said second window;
  wherein said control means includes:
    (b-1) means for clicking said object by placing it at any location on an appropriate area of said first window with said input means so as to start an operation of a turn-over function;
    (b-2) means for evaluating a first location on said first window where said clicking is made;
    (b-3) means for setting an appropriate fulcrum in accordance with a result of said evaluation step;
    (b-4) means for evaluating whether or not said input means is dragged toward said fulcrum;
    (b-5) means for calculating an amount of turning over said first window based on said first location and said second location if said input means is dragged to a second location on said first window toward said fulcrum in the step (b-4); and
    (b-6) means for turning over said first window toward said fulcrum insequential manner in accordance with said calculated amount of turning over so that a movement of said first window is animated as if it is being rolled in a pseudo-three dimensional manner to unveil said second window that is laid under said first window.

7. A system for turning over a window according to claim 6, wherein said system further comprises:
  (c) means for inactivating said operation of turning in accordance with said input means to put said first window in an initial state thereof, thereby veiling said second window as being laid under said first window.

8. A system for turning over a window according to claim 6, wherein said appropriate area is any part of a frame of said first window, and
  wherein said means for setting said appropriate area includes at least one of:
    (b-3-1) means for setting a point at which two lines intersect at right angle to each other in a right triangle as said fulcrum such that a hypotenuse thereof is formed by a diagonal from said clicked corner to an opposite corner thereof, if it is clicked at a corner of said first window in the step (b-3); and
    (b-3-2) means for setting a center of an opposite side of said clicked side as said fulcrum, if it is clicked at a side of said first window in the step (b-3).

9. A system for turning over a window according to claim 6, wherein said appropriate area consists of a plurality of blocks, said plurality of blocks covering an entire area of said first window.

10. A system for turning a window according to claim 9, wherein said appropriate area consists of four blocks, said four blocks covering an entire area of said first window, and wherein said four blocks include a first block having a first vertex of said first window, a second block having a second vertex of said first window, and a third block having a third vertex of said first window, and a fourth block having a fourth vertex of said first window,
  wherein said means for setting said appropriate area includes any one of:
    (b-3-1) means for setting said first vertex as a starting point and setting said fourth vertex as said fulcrum if it is clicked on said first block in the step (b);
    (b-3-2) means for setting said second vertex as a starting point and setting said third vertex as said fulcrum if it is clicked on said second block in the step (b);
    (b-3-3) means for setting said third vertex as a starting point and setting said second vertex as said fulcrum if it is clicked on said third block in the step (b); and
    (b-3-4) means for setting said fourth vertex as a starting point and setting said first vertex as said fulcrum if it is clicked on said fourth block in the step (b).

11. A recording medium having a program that is laid over another window in a multi-window computer system, in order to peek in a pseudo-three dimensional manner at a content of said another window that is laid under said window, said program comprising the steps of:
  (a) selecting a first window from said multiple windows by placing an object on said first window;
  (b) clicking said object on said first window to initiate an operation of turning over; and
  (c) dragging said object toward a direction to which said first window is to be turned over so as to unveil a second window that is laid under said first window, whereby enabling to peek at a content of said second window;
  wherein said step (b) further comprises the steps of:
    (b-1) clicking said object by placing it at any location on an appropriate area of said first window so as to start an operation of a turn-over function;
    (b-2) evaluating a first location on said first window where said clicking is made; and
    (b-3) setting an appropriate fulcrum in accordance with a result of said evaluation step;
  wherein said step (c) further comprises the steps of:
    (c-1) evaluating whether or not said object is dragged toward said fulcrum;
    (c-2) if said object is dragged to a second location on said first window toward said fulcrum in the step (c-1), then calculating an amount of turningover said first window based on said first location and said second location; and
    (c-3) turning over said first window toward said fulcrum in a sequential manner in accordance with said calculated amount of turning over so that a movement of said first window is animated as if it is being rolled in a pseudo-three dimensional manner to unveil said second window that is laid under said first window.

12. A recording medium having a program according to claim 11, said program further comprising the step of:

(d) inactivating said operation of turning to put said first window in an initial state thereof, thereby veiling said second window as being laid under said first window.

13. A recording medium having a program according to claim 11, wherein said appropriate area is any part of a frame of said first window, and wherein said step (b-3) includes at least one of the steps of:

(b-3-1) if it is clicked at a corner of said first window in the step (b-3), then as said fulcrum, setting a point at which two lines intersect at right angle to each other in a right triangle such that a hypotenuse thereof is formed by a diagonal from said clicked corner to an opposite corner thereof; and (b-3-2) if it is clicked at a side of said first window in the step (b-3), then as said fulcrum, setting a center of an opposite side of said clicked side.

14. A recording medium having a program according to claim 11, wherein said appropriate area consists of a plurality of blocks, said plurality of blocks covering an entire area of said first window.

15. A recording medium having a program according to claim 14, wherein said appropriate area consists of four blocks, said four blocks covering an entire area of said first window, and wherein said four blocks include a first block having a first vertex of said first window, a second block having a second vertex of said first window, and a third block having a third vertex of said first window, and a fourth block having a fourth vertex of said first window, wherein said step (b-3) includes any one of the steps of:

(b-3-1) if it is clicked on said first block in the step (b), setting said first vertex as a starting point and setting said fourth vertex as said fulcrum;

(b-3-2) if it is clicked on said second block in the step (b), setting said second vertex as a starting point and setting said third vertex as said fulcrum;

(b-3-3) if it is clicked on said third block in the step (b), setting said third vertex as a starting point and setting said second vertex as said fulcrum; and (b-3-4) if it is clicked on said fourth block in the step (b), setting said fourth vertex as a starting point and setting said first vertex as said fulcrum.

* * * * *